United States Patent
Cuffaro et al.

(10) Patent No.: US 6,418,317 B1
(45) Date of Patent: Jul. 9, 2002

(54) METHOD AND SYSTEM FOR MANAGING FREQUENCIES ALLOCATED TO A BASE STATION

(75) Inventors: Angelo Cuffaro, Pierrefonds; Michel Desgagné, St-Hubert, both of (CA); Arne Simonsson, Gammelstad (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/452,566

(22) Filed: Dec. 1, 1999

(51) Int. Cl.7 .............................. H04Q 7/20
(52) U.S. Cl. .............. 455/450; 455/62; 455/452; 455/509
(58) Field of Search .................. 455/446, 450, 455/451, 452, 453, 447, 509, 62

(56) References Cited

U.S. PATENT DOCUMENTS

| | | | | |
|---|---|---|---|---|
| 5,280,630 A | * | 1/1994 | Wang | 455/450 |
| 5,490,137 A | * | 2/1996 | Hulsebosch et al. | 455/450 |
| 5,666,655 A | * | 9/1997 | Ishikawa et al. | 455/450 |
| 5,701,590 A | | 12/1997 | Fujinami | 455/62 |
| 5,737,705 A | * | 4/1998 | Ruppel et al. | 455/452 |
| 5,898,928 A | * | 4/1999 | Karlsson et al. | 455/450 |
| 6,295,453 B1 | * | 9/2001 | Desgagne et al. | 455/450 |

FOREIGN PATENT DOCUMENTS

| | | |
|---|---|---|
| EP | 0 817 521 A2 | 6/1997 |
| EP | 1022921 | 1/2000 |
| WO | WO 9713388 | 4/1997 |
| WO | WO 9732444 | 9/1997 |
| WO | WO 98/48586 | 4/1998 |
| WO | WO 98/56204 | 6/1998 |
| WO | WO 9905878 | 2/1999 |
| WO | WO 0060896 | 10/2000 |

OTHER PUBLICATIONS

International Search Report, PCT/SE00/02270, dated May 28, 2001.

* cited by examiner

Primary Examiner—William Trost
Assistant Examiner—Simon Nguyen
(74) Attorney, Agent, or Firm—Jenkens & Gilchrist; Sandra Beauchesne

(57) ABSTRACT

The present invention is a method and system for managing frequencies allocated to a cell within a cellular network to assign certain ones of those allocated frequencies for use by channel equipment within that cell. The method measures at least one quality metric for each of the allocated frequencies. At least one measured quality metric for the unassigned frequencies are compared against at least one quality metric for the assigned frequencies. An unassigned frequency is swapped for an assigned frequency based upon the comparison step. Additionally, a voting step is used to indicate that either the unassigned frequency or the assigned frequency has a higher signal quality for communication.

34 Claims, 6 Drawing Sheets

| FREQUENCY /400 | INTERFERENCE (dBm) /405 | USE /410 | ASSIGNED /415 |
|---|---|---|---|
| F1 | | USED | ASSIGNED |
| F8 | | USED | ASSIGNED |
| F15 | −117 | IDLE | ASSIGNED |
| F22 | −106 | IDLE | ASSIGNED |
| F29 | −110 | | UNASSIGNED |
| F36 | −105 | | UNASSIGNED |
| F43 | −118 | | UNASSIGNED |
| F50 | −95 | | UNASSIGNED |

*FIG. 4*

Note: +3dB hysteresis added to each unassigned interference measurement before voting

| ASSIGNED / UNASSIGNED | F1 | F8 | F43 | F22 |
|---|---|---|---|---|
| F29 | +2 | −6 |  | −4 |
| F36 | −8 | −8 |  | −6 |
| F15 |  |  | −8 |  |
| F50 | −8 | −8 |  | −4 |

FIG. 5C

| ASSIGNED / UNASSIGNED | F1 | F8 | F43 | F22 |
|---|---|---|---|---|
| F29 | +2 | −6 | −4 | −4 |
| F36 | −8 | −8 | −2 | −6 |
| F15 | −4 | −2 | −8 | −2 |
| F50 | −8 | −8 | 0 | −4 |

FIG. 5D

| ASSIGNED / UNASSIGNED | F1 | F8 |
|---|---|---|
| F29 | (+30,+12) | (+28,+14) |
| F36 | (+28,+14) | (+30,+12) |
| F43 | (−30,−30) | (−10,−30) |
| F50 | (+30,+10) | (−8,−10) |

600   (x,y)=(uplink differential, downlink differential)

*FIG. 6A*

| ASSIGNED / UNASSIGNED | F36 | F29 |
|---|---|---|
| F8 | (−30,−12) | (−28,−14) |
| F1 | (−28,−14) | (−30,−12) |
| F43 | | |
| F50 | | |

*FIG. 6B*

METHOD AND SYSTEM FOR MANAGING FREQUENCIES ALLOCATED TO A BASE STATION

BACKGROUND OF THE INVENTION

1. Technical Field of the Invention

The present invention relates to cellular telephone systems, and, in particular, to a method for managing the use of frequencies allocated to a cell.

2. Description of Related Art

Cellular telephone systems divide a large service area into a number of smaller discrete geographical areas called "cells" each typically ranging in size from about one-half to about twenty kilometers in diameter. Each cell is contiguous with multiple adjacent cells to provide continuous coverage throughout the service area. A base station including a plurality of transceivers (i.e., channel equipment) capable of operating independently on different radio frequencies is provided for each of the cells. Via the transceivers, the base stations engage in simultaneous communications with plural mobile stations operating within the area of the associated cell. The base stations further communicate via data links (and voice trunks) with a central control station, commonly referred to as a mobile switching center, which functions to selectively connect telephone calls to and from the mobile stations through the base stations and, in general, control operation of the system.

Each cell is allocated the use of a predetermined set of frequencies, wherein each frequency comprises a physical channel supporting a plurality of logical channels (i.e., timeslots) therein. The availability of multiple frequencies per cell, with multiple logical channels per frequency, permits base stations to simultaneously handle many telephone conversations with many mobile stations. The frequencies allocated to a cell are preferably spaced apart across the frequency spectrum of the cellular band such that adjacent cells are not assigned close frequencies. This serves to minimize the instances of adjacent channel interference.

Because only a limited number of frequencies are available in the cellular band, an allocation of the same frequencies is repeated (i.e., reused) in other cells in a distant part of large service areas with many cells. No adjacent cells, however, are allocated the same frequency. Furthermore, the power levels of the signal transmissions on any given frequency are limited in strength. The foregoing precautions serve to minimize the likelihood of co-channel interference caused by reuse of that same frequency in a distant cell.

Although each cell is allocated certain specific frequencies and those specific frequencies are reused in a distant part of a large service area, it has been shown that interference may increase to the point of degrading quality when the frequency reuse plan is changed from, for instance, a 7/21 reuse to a 4/12 reuse, without over-dimensioning the transceivers. Traditional channel selection techniques for selecting the traffic channels for mobile stations use, such as interference driven channel selection (IDCS), are unable to overcome the quality degradation of reduced frequency reuse plan cellular systems. In order to improve the quality, the idea of creating virtual frequencies has developed to enable an increase in system capacity. The set of frequencies that are allocated to the cell are often referred to as "virtual frequencies". The virtual frequency set includes assigned and unassigned frequencies. Assigned frequencies are those frequencies operating on available transceivers with a base station serving a cell. Unassigned frequencies are created by allocating more frequencies to a base station serving a cell than there are available transceivers to handle those frequencies.

One problem of the previously described telecommunications systems implementing interference driven channel selection is a degradation of signal quality when increasing capacity on the telecommunications system. Another problem is that the gain of current channel selection methods is decreased during periods of high traffic load. Without unassigned frequencies, there are fewer free frequencies to select among when assigning calls to traffic channels and the gain degrades using interference reducing methods, such as quality driven channel selection (QDCS) and interference driven channel selection (IDCS).

SUMMARY OF THE INVENTION

The present invention solves the problem of degradation of signal quality when increasing capacity on an interference driven channel selection/quality driven channel selection (IDCS/QDCS) equipped telecommunications system. The present invention improves signal quality by managing the frequencies allocated to a base station serving a cell to select the best of those allocated frequencies for assignment to base station transceivers. Measured quality metrics for certain ones of the allocated frequencies that are currently assigned to transceivers in the base station are compared against measured quality metrics for certain ones of the allocated frequencies that are currently unassigned to transceivers in the base station. Responsive to the results of the comparison, the best unassigned frequency is swapped for the worst assigned frequency.

The present invention provides a method for managing frequencies allocated to a cell within a cellular network to assign the best frequencies for use by channel equipment within that cell. The method measures at least one quality metric with respect to the allocated frequencies and compares the quality metrics for currently unassigned frequencies against the quality metrics for currently assigned frequencies. The best unassigned frequency is then swapped for the worst assigned frequency. Additionally, a voting step is used when comparing to indicate whether the unassigned frequency or the assigned frequency has a higher signal quality for communication.

Another aspect of the present invention is a method for assigning frequencies allocated to a base station serving a cell within a telecommunications network. At least one quality metric for at least two of the m frequencies allocated to the base station are measured. There are n of the m allocated frequencies currently assigned to the transceivers of the base station and m−n frequencies currently unassigned to the transceivers of the base station. A voting step occurs between the n assigned and the m−n unassigned frequencies based on the measured metrics to indicate whether the currently assigned or currently unassigned frequency is of better quality. The best m−n unassigned frequency is then swapped for the worst n assigned frequency in response to a positive vote for that particular unassigned frequency. Additionally, a step of comparing at least one metric of the n assigned frequencies to the m−n unassigned frequencies is performed.

Another aspect of the present invention is a system for arranging a set of frequencies allocated to a base station serving a cell within a telecommunications system. The system has a measuring device to measure at least one quality metric for a frequency currently assigned to a transceiver of a base station and at least one quality metric for a frequency not currently assigned to a transceiver. A processor operates to compare the measured quality metrics and exchange a certain one of the currently unassigned frequencies for a certain one of the currently assigned frequencies based upon the relative difference of the quality metrics. Additionally, the processor operates to vote, which adds a numeric value to a memory location based upon the results of the comparison of the quality metrics. A filter within the processor may also be included to prevent the swapping operation from occurring before a particular event occurs.

BRIEF DESCRIPTION OF THE DRAWINGS

A more complete understanding of the method and apparatus of the present invention may be acquired by reference to the following Detailed Description when taken in conjunction with the accompanying Drawings wherein:

FIG. 4 is an exemplary table showing each frequency allocated to a cell and the interference measurements for each frequency;

FIG. 5C is an exemplary table (VFE matrix) showing the results after swapping an assigned frequency with an unassigned frequency;

FIG. 5D is an exemplary table (VFE matrix) showing the results after swapping an assigned frequency with an unassigned frequency including results from a Mono-VFE matrix;

FIG. 6A is an exemplary table (VFE matrix) showing the results after voting for forty samples; and FIG. 6B is an exemplary table (VFE matrix) showing the results after swapping two assigned frequencies with two unassigned frequencies.

DETAILED DESCRIPTION OF THE DRAWINGS

There are a plurality of radio frequencies in the cellular band available to cellular telephone system providers for use in communicating with mobile stations. These radio frequencies support both traffic channels and control channels. The traffic channels are used for carrying telephone voice or data conversations. The control channels are used for carrying system operation control signals (commands). Such control signals include page signals, page response signals, location registration signals, traffic channel assignments, maintenance instructions, and cell selection or re-selection instructions.

A cellular service area can cover a large geographic area, and in many instances there will be a need for a large number of cells that often exceeds in number the number of cells provided by dividing the available radio frequencies in such a manner as to handle expected subscriber usage. Accordingly, in order to provide sufficient call handling capacity throughout the service area, the cells are grouped into clusters of cells and the radio frequencies in the cellular band are reused in each of the clusters.

Figure 1:
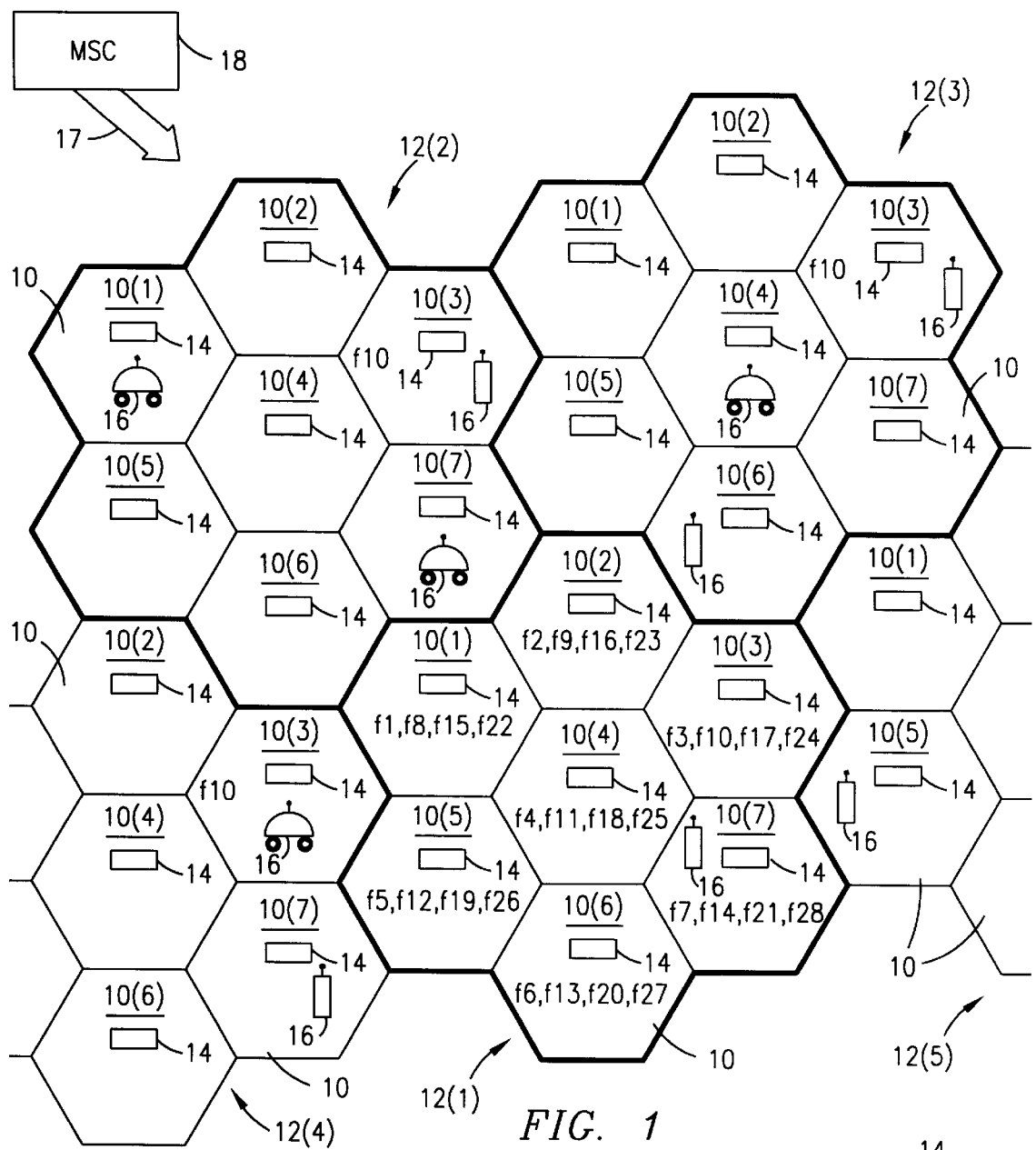
FIG. 1 is an exemplary cell diagram schematically illustrating a frequency reuse cellular telephone system wherein the present invention is implemented.

Reference is now made to FIG. 1 for an illustration of an example of the frequency reuse concept commonly utilized in cellular systems. An arbitrary geographic area (hereinafter "the service area") is divided into a plurality of contiguous cells 10 schematically represented by hexagons. The cells 10 are then grouped into clusters 12 (outlined in bold to ease recognition), which in the present example comprise seven cells 10(1)–10(7) in each cluster. Assume for this example that there are a total of twenty-eight frequencies fn (wherein n=1 to 28) available in the cellular band for simplicity, no virtual frequencies are shown in FIG. 1. It will of course be understood that each frequency actually comprises a paired uplink and downlink frequency. The frequencies f1–f28 are divided equally amongst the cells 10(1)–10(7) to provide four frequencies per cell. Thus, each of the cells 10(1) in the service area is allocated frequencies f1, f8, f15 and f22 for carrying its traffic and control channels. Similar allocations are made for each of the remaining cells 10, with the frequencies also being reused across each of the included clusters 12. The complete allocation of the frequencies f1–f28 to the cells 10(1)–10(7) in each cluster 12 in accordance with this example of cellular frequency reuse is illustrated in detail in FIG. 1 with respect to cluster 12(1).

It is noted in this frequency reuse scheme that in no instance have adjacent cells been allocated use of the same frequency. Reuse of an identical frequency in the service area at a minimum requires a separation of at least one cell 10 along with a regulation of broadcast power from each cell to constrain radio propagation substantially within the cell area. Furthermore, it is noted that in no instance does any one cell 10 utilize adjacent frequencies in the cellular band. Adjacent frequencies should exist no closer than one cell 10 away from each other. By arranging the cells 10 in clusters 12 as shown in the figure, regulating broadcast power of communications within the cell, and further by allocating frequencies in the fashion described above and shown in the figure, the likelihood of interference is minimized while simultaneously providing effective and efficient cellular communications services across a very large service area.

In spite of the precautions taken to avoid interference, it is known that interference does occur in cellular systems like that previously described. One aspect of this interference originates from communications occurring in the cells of other clusters 12 on the same frequency (i.e., co-channel interference). To understand this phenomena, assume the existence of concurrent voice communications using frequency f10 (and perhaps individual timeslots therein) in each of the cells 10(3) in each of the clusters 12(2), 12(3) and 12(4) as shown in FIG. 1. In spite of any imposed broadcast power limitations, a certain amount of the radio frequency energy of those voice communications propagates beyond the respective cell boundaries and is injected as interference into frequency f10 in cell 10(3) of cluster 12(1).

Another aspect of this injected interference originates from communications occurring in other cells on adjacent frequencies (i.e., adjacent channel interference) To understand this phenomena, assume the existence of concurrent voice communications on frequency f8 in cell 10(1) and frequency f9 in cell 10(2), and perhaps individual timeslots therein, of cluster 12(1) as shown in FIG. 1. In spite of any regulations on broadcast power and the presence of guard bands around each of the frequencies, improper transceiver broadcasts around one frequency (for example, f8) may be injected as interference into the adjacent frequency f9. It should be recognized that adjacent channel interference is not nearly as common an occurrence as co-channel interference in well regulated and stable communication systems.

Because this injected interference may adversely affect cellular voice or data communications over a given frequency, it would be unwise for the system to act during certain times of high interference by assigning the given frequency (or channel therein) to a transceiver. Selecting the "best" channels and frequencies using channel assignment techniques, such as quality driven channel selection (QDCS) or interference driven channel selection (IDCS), may not be suitable for increased capacity systems. To improve performance of higher capacity systems, it may require that a base station assign higher quality frequencies to transceivers within the base station using uplink and downlink signal quality measurements to determine the "best" frequencies allocated to the base station to assign.

Each of the cells 10 in a cellular system such as that illustrated in FIG. 1 includes at least one base station (BS) 14 configured to facilitate radio frequency communications with mobile stations 16 roaming throughout the service area. The base stations 14 are illustrated as being located at or near the center of each of the cells 10. However, depending on geography and other known factors, the base stations 14 may instead be located at or near the periphery of, or otherwise away from the centers of, each of the cells 10. In such instances, the base stations 14 may broadcast and communicate with mobile stations 16 located within the cells 10 using directional rather than omni-directional antennas. The base stations 14 are connected by communications links (illustrated schematically by arrow 17) to at least one mobile switching center (MSC) 18 operating to control the operation of the system for providing cellular communications with the mobile stations 14.

Figure 2:
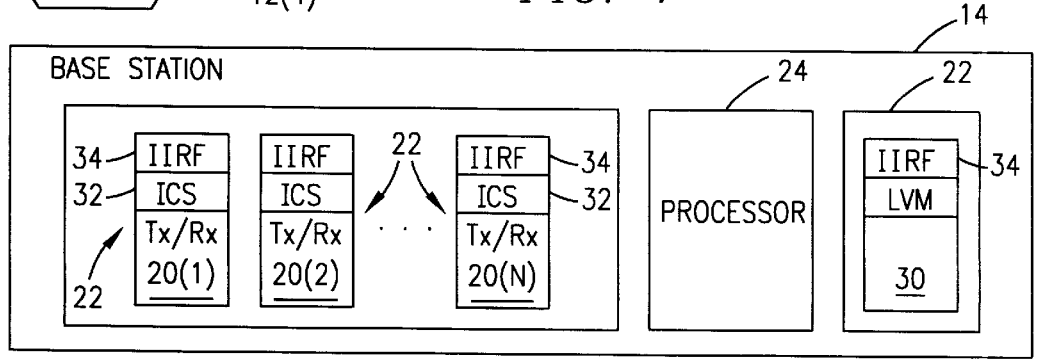
FIG. 2 is a simplified block diagram of a base station in accordance with the present invention for use in the frequency reuse cellular telephone system of FIG. 1.

Reference is now additionally made to FIG. 2 wherein there is shown a simplified block diagram of a base station 14 used in the system of FIG. 1 in accordance with the present invention. The base station 14 includes a plurality of transceivers (Tx/Rx) 20(1) through 20(n), wherein n is the number of frequencies assigned to the cell 10 served by the base station. In the exemplary system shown in FIG. 1, n=4 wherein seven cells 10 are included in each cluster 12 and a total of twenty-eight available radio frequencies are included in the cellular band. It should be understood that the present invention includes m frequencies allocated to each base station, so that there are m−n frequencies unassigned to each base station. The total set of assigned and unassigned frequencies is considered a virtual frequency set. The transceivers 20 have a configuration known in the art that includes a transmitter and a receiver tuned to operate on one of the frequencies assigned to the base station 14 for its traffic and/or control channels. Each assigned frequency provides a plurality of digital TDMA channels (i.e., plural full rate (FR) channels) for mobile station use.

The base station 14 also includes a signal strength measurement device 22 that is used in one mode known in the art during hand-off to measure the uplink signal strength of another station's communications on the frequency channels assigned to other cells. The operation of the signal strength measurement device 22 of each base station 14 is further controlled in an additional operating mode in accordance with the present invention by received mobile switching center commands and/or the base station programming to measure a quality metric (such as the received uplink signal strength) for each of the frequencies supporting idle traffic channels allocated to its own base station. These measurements are made at selected times or are made periodically in accordance with system specifications. The results of the idle channel measurements provide an indication of the amount of injected uplink interference caused by same or adjacent channel communications occurring simultaneously within the system, or caused by any other interference source. The idle traffic channel signal strength measurements comprising the measured uplink interference (on either a frequency or timeslot basis) are reported by the signal strength measurement device 22 of the base station 14 to either a processor 24 within the base station or the mobile switching center 18 (perhaps along with the hand-off traffic channel signal strength measurements made on the frequencies/channels allocated to other cells) and are considered in connection with the process for selecting and assigning traffic channels.

In one embodiment of the base station, the signal strength measurement device 22 comprises a locating verification module (LVM) 30 including a receiver and frequency synthesizer for selectively tuning to any one of the frequencies available in the cellular band. As each of the frequencies allocated to a cell 12 is subdivided into a plurality of timeslots comprising the traffic channels, the locating verification module 30 further includes a circuit (not explicitly shown) for synchronizing operation of the module to the TDMA communications protocol being implemented by the system so that the signal strength measurements on a selected frequency may be made during each of the plurality of included timeslots therein. This would include not only the frequencies/timeslots allocated to and used by other cells, but also the frequencies/timeslots allocated to and used by the cell served by the base station 14 (i.e., assigned to the channel equipment). The signal strength measurements made by the locating verification module 30 are then filtered by an infinite impulse response filter (IIRF) 34 before being subsequently processed in accordance with the present invention. The filtering removes fast changes in the measured interference levels to provide a stable estimate for output and subsequent processing. With respect to the implementation of the present invention, the idle channel supervision functionality 32 makes and reports measurements made on the frequencies/timeslots associated with idle traffic channels in order to supply uplink interference measurement data.

In another embodiment of the base station, the signal strength measurement device 22 comprises an idle channel supervision (ICS) functionality 32 associated with each transceiver 20. The idle channel supervision functionality 32 advantageously uses the receiver portion of the transceiver 20 to make the uplink signal strength measurements. This idle channel supervision functionality 32 may include a circuit (not explicitly shown) for synchronizing measurement operation to the TDMA communications protocol being implemented by the system so that the signal strength measurements on a selected frequency may be made during each of the plurality of included timeslots therein. The idle channel supervision functionality 32 makes and reports measurements made on the frequencies/timeslots associated with idle traffic channels in order to supply uplink interference measurement data. In addition to interference measurement data, other metrics, such as power levels and timeslot usage can be utilized to assess frequency channel availability.

The base stations report signal strength measurements on a per idle timeslot basis to either the processor 24 or the mobile switching center 18 for processing. A measurement processing means comprises either the processor 24 or the mobile switching center 18 operating to perform the management functionality of the present invention, which is to compare the quality metrics of the measurements and swap high signal quality unassigned frequencies with low signal quality assigned frequencies to the transceivers in the base station. By managing the allocated frequencies to the base station, the base station provides the frequencies with the highest signal quality for subscriber communication.

Figure 3:
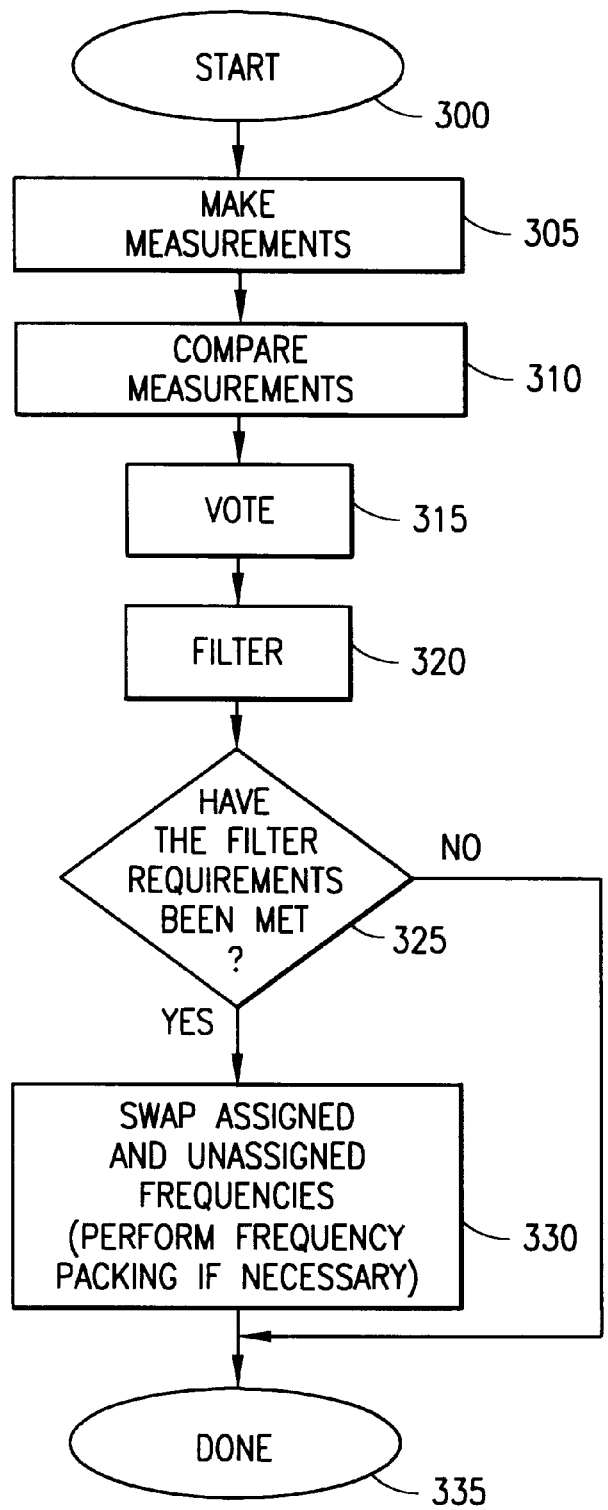
FIG. 3 is an exemplary flow diagram to manage the frequencies allocated to a cell.

Reference is now made to FIG. 3, where an exemplary flow diagram representing an embodiment of the present invention to manage frequencies allocated to a cell 10 within a telecommunications system is shown. The process starts at step 300 and at step 305, the system makes measurements of each frequency allocated to the cell 10. To reiterate, frequencies are allocated to a base station 14 serving a cell 10. For example, frequencies allocated to cell 10(1) are (f1, f8, f15, and f22).

A base station may have n transceivers 20, for instance, but the number of frequencies allocated to that base station 14 may be m (wherein m=n+15). The n number of "assigned" frequencies to a cell 10 is equal to the number of transceivers 20 within the base station 14 serving the cell 10 (i.e., n assigned frequencies). The number of unassigned frequencies to the cell 10 is m−n (or 15 in this case). These unassigned frequencies are allocated and remain allocated to the cell 10, but are not available for use without being assigned in accordance with the present invention to a transceiver 20.

In step 305, each allocated frequency channel (assigned and unassigned) within the cell 10 is measured to obtain a quality metric, unless an assigned frequency channel is in use. The type of measurements made on each frequency may be uplink and downlink frequency channel measurements. When making the frequency channel measurements, a variety of quality metrics on each frequency may be measured. These quality metrics may include, for example, signal strength measurements and/or interference strength measurements.

In making measurements on the downlink frequency channels, advantageous use of a mobile assisted channel allocation feature is provided by cellular standard IS-136 is made. Mobile stations 16 may be used to measure the signal strength on each frequency allocated to the base station 14 serving the cell 10 prior to a page response, a call origination or a call registration. These measurements may then be reported back to the base station 14, which may in turn report the measured downlink frequency channels to the MSC 18. Alternatively, the mobile stations 16 may be commanded by the base station 14 to make continuous measurements, for instance, once per second on the downlink frequency channels allocated to the cell 10 and report the measurements to the base station 14.

In making the uplink frequency channel measurements, the LVM may be used to scan the list of frequencies allocated to the cell. The LVM may be commanded to make these measurements when not busy performing location and verification measurements. The LVM may make as many as 50 frequency (150 timeslot) measurements per second or more.

When making measurements on the frequencies that are assigned to the base station 14, in general, the measurements are made on the current idle assigned frequencies. It should be understood that a system having multiple timeslots per frequency channel (TDMA) may make measurements on the individual idle timeslots. The measurements may also be made over a moving time window.

At step 310, the signal quality measurements are compared. The measurements that are compared are the quality metric measurements made on unassigned frequency channels against the quality metric measurements made on assigned idle frequency channels. It should be noted that the unassigned downlink frequency channels are compared to the assigned idle downlink frequency channels and are not compared to the assigned idle uplink frequency channels. In making a comparison, it is typical to add a certain number of decibels (dB) to unassigned frequency measurements to account for a hysteresis. The results of the comparison indicate whether the quality metrics of any unassigned frequency channel is better (e.g., include less injected interference) than the quality metrics of any assigned idle frequency channel.

At step 315, a vote is made for the unassigned frequency channel or the assigned idle frequency channels based upon the results of the measurements compared at step 310. The step of voting 315 basically adds and subtracts numerical values in a virtual frequency exchange (VFE) matrix or memory location after each measurement sample. Each of these numeric values may be a fixed value (e.g., the value 1), the actual difference value in decibels, a difference of the average value over a number of sample periods or time interval, or a percentage difference in the number of times a certain unassigned frequency has a better signal quality than an assigned allocated frequency.

This voting at step 315 may take place with respect to the uplink frequency channels, the downlink frequency channels, or both. When voting on both the uplink and downlink frequency channels, a cost function may also be implemented to weight the uplink or downlink frequency channels the same or one of them more heavily than the other. The voting in step 315 is hereinafter discussed in greater detail in the discussion for FIGS. 5A–D and 6A–B.

At step 320, the system performs a filtering operation to prevent the system from swapping unassigned and assigned frequencies too early or too often. The step of filtering 320 may require a minimum number of samples to have been taken or a minimum period of time to have passed so that the quality of performance of the system is improved by having it not react to instantaneous or to short term interferences.

In addition to a minimum number of samples or a minimum period of time, the step of filtering 320 may also prevent the step of swapping 330 from occurring except at or around a certain event (such as, at call step up, at call hand-off or at the end of the day). To summarize, the filtering step 320 may be used to limit the step of swapping 330 until a minimum number of samples have been taken, a minimum time duration has passed or a particular function in the system occurs.

At step 325, a decision block makes a determination as to whether the swapping requirements have been met based upon the filtering step 320. If the swapping requirements have been met at step 325, step 330 performs the swapping operation to swap unassigned and assigned idle frequency channels. In order to swap an assigned frequency, each timeslot within the assigned frequency must be idle (i.e., not in use). The system may perform a frequency packing operation (i.e., moving a call from a timeslot in a first frequency to a timeslot in a second frequency) so that all timeslots within an assigned frequency become idle. By having each timeslot within an assigned frequency be idle, the system may perform the swapping of an unassigned frequency for an assigned frequency at step 330. Once the swap at step 330 is complete, the process is done at step 335.

If the filter requirements have not been met at step 325, then the step of swapping 330 is bypassed and the process is done at step 335. It should be understood that this process may cycle or continue until the filter requirements have been met.

With reference now to FIG. 4, a table showing the frequencies 400 allocated to a cell 10 (such as cell 10(1)) is shown in column 1. An interference measurement 405 for a single measurement iteration for each of the unassigned and assigned idle frequencies are shown in column 2. A present use status 410 for each unassigned and assigned idle frequency channel is shown in column 3. It should be remembered that a frequency that is assigned may be in use or may be idle, but that the frequencies being used are not measured for injected interference. For instance, frequency f1 is currently in use by a subscriber and frequency f15 is currently idle (i.e., carrying no subscriber at the present time).

An assigned and unassigned status 415 is shown in column 4. Frequencies f29, f36, f43, and f50 are presently unassigned to the cell 10(1) and frequencies f1, f8, f15, and f22 are assigned to the cell. It should be noted that this table could be expanded so that the individual timeslots are included and that each timeslot could have its own interference measurement 405 and its own use status 410. Additionally, the interference measurements 405 could also be substituted for other quality metrics measured on each frequency channel, such as signal-to-noise ratio.

Figure 5A:
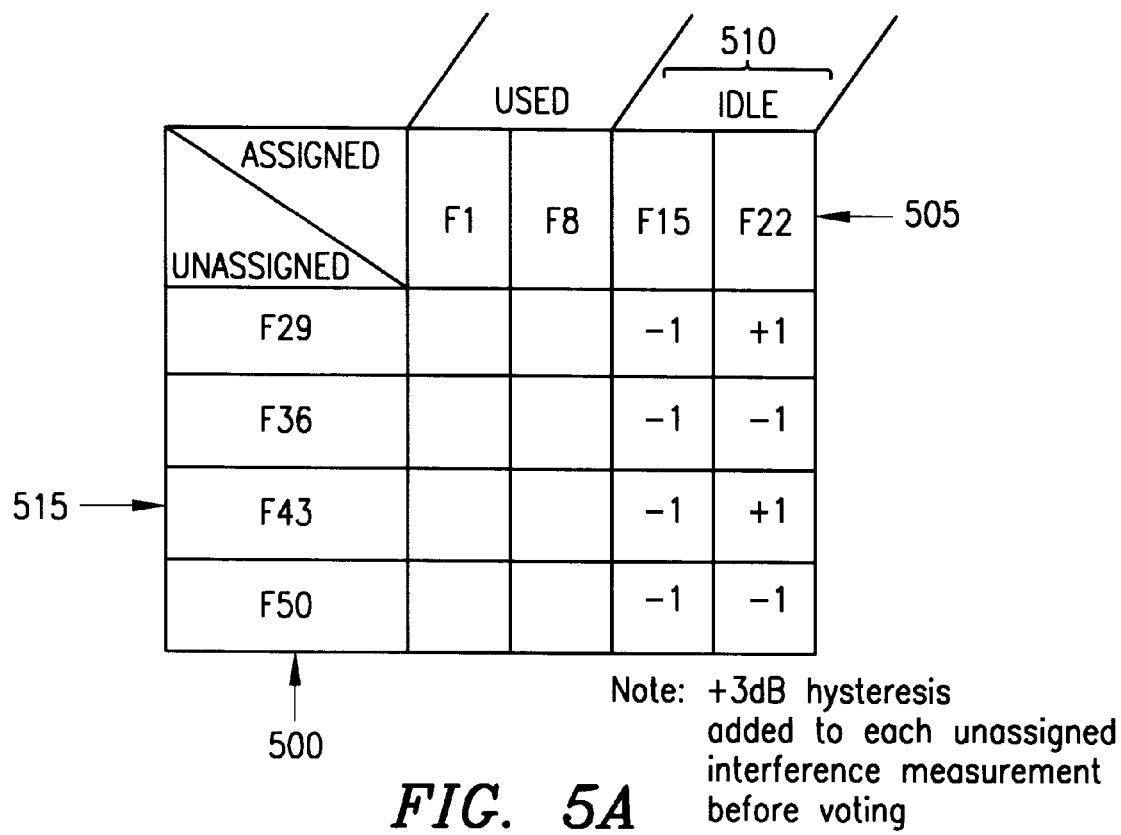
FIG. 5A is an exemplary table (VFE matrix) showing the results of a voting after a single sample.

Reference is now made to FIG. 5A, which shows a virtual frequency extension (VFE) table. The VFE table shows the results of a vote after a single sample period. In this table, the unassigned frequencies 500 are shown in column 1 and the assigned frequencies 505 are shown in row 1. Note that these are the same frequencies that were unassigned and assigned to cell 10(1) in FIG. 4. The unassigned frequencies 500 are compared to the assigned idle frequencies 510 in the cell 10.

To better understand the voting procedure, the results of the voting for unassigned frequency f43 515 will be reviewed. It should be noted that a three decibel (3 dB) hysteresis is added to each idle interference measurement for the unassigned frequency before voting. In the case of unassigned frequency f43, the interference measurement is −118 dBm, so that the hysteresis adjusted interference measurement is −115 dBm. The adjusted interference measurement for unassigned frequency f43 is compared to each of the assigned idle frequencies 510 in the cell 10(1). If the adjusted interference measurement is below (i.e., more negative) than the assigned idle frequency measurements 510, then a vote for the unassigned frequency f43 is indicated as a +1. If the unassigned frequency adjusted interference measurement is higher than (i.e., less negative) an idle assigned frequency 510, then a vote is made for the assigned idle frequency and indicated as a −1.

The interference measurement 405 for unassigned frequency f43 is −118 dBm with an adjusted interference measurement of −115 dBm. Since −115 dBm for unassigned frequency f43 is higher than the interference measurement of assigned idle frequency f15 of −117 dBm, a vote is cast for assigned idle frequency f15 as a −1 in the VFE matrix. The adjusted interference measurement for idle frequency f43 is more negative than the assigned idle frequency f22, so that a vote is cast in favor of unassigned frequency f43 and a +1 is placed into the corresponding matrix element or memory location. It should be understood that this voting in the VFE matrix shows only a single sample vote and that the number of samples could be extended to any number of samples that the operator chooses. If the number of samples were extended, then the number of votes for a given frequency pair would simply be added up over the total number of samples taken. A "frequency pair" or "cell pair" is defined as an unassigned and an assigned frequency that have their quality metric measurements compared, whereby the results of the comparing and voting operations are stored in an intersecting VFE matrix cell.

Each cell (i.e., memory location) in the VFE matrix indicates the probability in which the unassigned frequencies are better/worse than the assigned idle frequencies. For instance, if the number of samples is ten and the cell between an unassigned and an assigned idle frequency is +4, it means that the unassigned frequency received four more votes than the assigned idle frequency for those ten samples. In other words, the number of votes for the unassigned frequency is seven and the number of votes for the assigned idle frequency is three. This means that the probability that the unassigned frequency is better than the assigned idle frequency is 70% or 7/10. Similarly, if the number between an unassigned and assigned idle frequency is −4, then that indicates that the unassigned frequency received only three out ten votes and the probability is 30% that the unassigned frequency is better than (i.e., contains less injected interference) the assigned idle frequency.

Figure 5B:
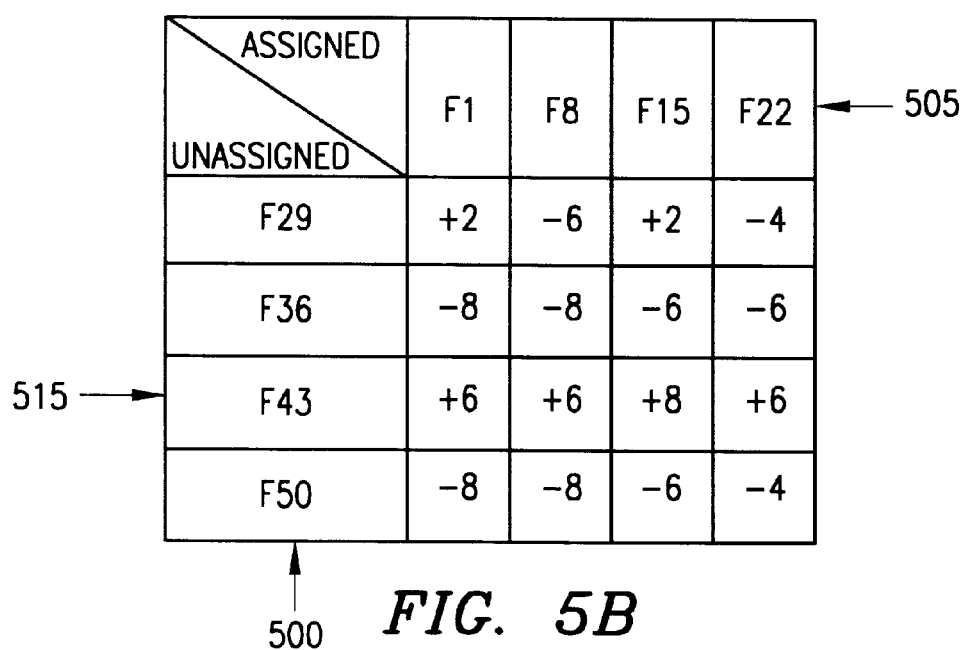
FIG. 5B is an exemplary table (VFE matrix) showing the results after voting for ten samples.

Reference is now made to FIG. 5B, which shows a VFE matrix having, for exemplary purposes, the results of ten samples in each matrix element. It should be understood that while a frequency channel may be in use for a single or multiple number of sample measurements, the frequency channel may be idle during other sample measurements. For instance, in FIG. 5A, frequencies f1 and f8 were in use during the sample measurement so that no measurements were taken for those frequencies. In FIG. 5B, however, over the total number of samples measured, frequencies f1 and f8 were idle at various times and frequencies f15 and f22 were in use at various times, so that a total of ten samples were taken for each frequency.

With reference still to FIG. 5B, the votes were cast for each of the unassigned frequency 500 and assigned frequency 505 pairs to form a completely filled in VFE matrix of voting results. As can be seen, the f43 and f15 frequency pair 520 has the most positive result (i.e., +8 or 90% probability that f43 has a higher quality metric than f15) of the voting process for the ten sample measurements. It should be noted that in conjunction with IDCS, which tries to select the least interfered frequency, virtual frequency exchange tends to swap out the worst frequencies since the worst frequencies are the least used.

Reference is now made to FIG. 5C, which contains the same frequencies allocated to cell 10(1). The best unassigned and worst assigned frequencies (i.e., f43 and f15, respectively), as computed by the voting process, are shown as swapped in the VFE matrix. As described above, unassigned frequency channel f43 has the highest probability of the unassigned frequency channels 500 having a higher quality metric than the assigned frequencies 505 and f15 has a lower quality metric than the unassigned frequencies 500. These frequencies are swapped so that f43 becomes a frequency that is assigned and f15 becomes a frequency that is unassigned to the base station servicing cell 10(1). The empty VFE matrix elements 525, for example, indicate that no voting has taken place between those frequency pairs before or since the swap. The other VFE matrix elements may be preserved with their pre-swap values being inverted in sign due to the unassigned frequency now being the reference frequency. Alternatively, all of the VFE matrix elements may be reinitialized and the voting process produces new values in the VFE matrix over a new time or sample period.

With reference now to FIG. 5D, an alternative to only comparing assigned to unassigned frequencies is to compare assigned to assigned frequencies and unassigned to unassigned frequencies. Mono-VFE matrices (not shown), which are VFE matrices created to store voting results for the assigned-to-assigned frequency comparisons and the unassigned-to-unassigned frequency comparisons. When the best unassigned frequency is swapped with the worst unassigned frequency, the voting results stored in the mono-VFE matrices are used to fill the empty VFE matrix elements in FIG. 5C, as shown in FIG. 5D.

As an alternative to the voting scheme using a fixed numeric value, the voting scheme may also use the actual difference in decibels between the allocated and the unallocated idle frequency pair. Similarly, the difference can be averaged over a number of samples and the evaluation can take place over a sample interval or a time interval.

The different types of voting schemes may be applied to the uplink measurements provided by the LVM within the signal strength measurement device 22. Alternatively, both uplink and downlink measurements may be used simultaneously to determine the highest quality frequency channels allocated to the cell 10. If both uplink and downlink measurements are used simultaneously, a cost function can be applied to the uplink and downlink measurements. In other words, a bias may be placed on the downlink measurements or on the uplink measurements depending upon the desires of the system operator and the empirical performance of the system.

A simple cost function such as C1*Up+C2*Dp may be applied, where C1 is a cost factor for the uplink measurements and C2 is a cost factor for the downlink measurements. Up and Dp are the probabilities for uplink and downlink frequency pairs being measured and compared.

Reference is now made to FIG. 6A where a partial VFE matrix is shown having both uplink and downlink voting for each unassigned and assigned idle frequencies. To show how the simple cost function may be applied to the uplink and downlink measurements as shown in FIG. 6A, we can set the cost factor for the uplink measurements C1=0.4 and the cost factor for the downlink measurements C2=0.6. If the number of samples is forty for every cell pair, then the cost function produces a value of −0.125 for cell pair {1,43} 600. Because unassigned frequency f1 lost to assigned idle frequency f43 by thirty votes (i.e., unassigned frequency won five out of forty contests or sample periods) on both the uplink and downlink frequencies, the uplink ratio −5/40 is multiplied by uplink cost factor 0.4 and the downlink ratio −5/40 is multiplied by downlink cost factor 0.6, resulting in −0.125, where the negative sign indicates that the unassigned frequency f1 lost to the assigned idle frequency f43 in signal quality. Applying the same cost function for each of the frequency pairs shown in FIG. 6A, the following results are produced:

{1,29}=0.74=0.4×35/40+0.6×26/40
{1,36}=0.745=0.4×34/40+0.6×27/40
{1,43}=−0.125=−(0.4×5/40+0.6×5/40)
{1,50}=0.725=0.4×35/40+0.6×25/40
{8,29}=0.745=0.4×34/40+0.6×27/40
{8,36}=0.74=0.4×35/40+0.6×26/40
{8,43}=−0.225=−(0.4×15/40+0.6×5/40)
{8,50}=−0.385=−(0.4×34/40+0.6×27/40)

If in the above example, an exchange probability requirement were set to 65%, then the filter 320 indicates that an exchange may take place as cell pairs {1,29}, {1,36}, {1,50}, {8,29}, and {8,36} all exceed the threshold criteria. Cell pair {1,36} is exchanged since it has the highest probability at 74.5% on row 1, and cell pair {8,29} may also be exchanged since it has the highest probability on row 2. Note that in a case where two cell pairs have the same probability, then the absolute differential may be used to determine which cell pair to exchange. Additionally, the present invention can exchange more than one cell pair at a time. The cost function may also be applied when using an absolute differential voting scheme. The best quality cell pair to swap may also be chosen by using a cost function, such as min (Up,Dp).

Reference is now made to FIG. 6B, which shows the results of swapping unassigned frequencies f36 and f29 with assigned frequencies f1 and f8, respectively. The VFE matrix cells are blank where no previous frequency pair voting was performed (e.g., f36 and f43 were not compared because both were unassigned frequencies) and the signs for the swapped frequency pairs are inverted. Alternatively, the VFE matrix cells may be reinitialized to start a new sampling period. It should be understood that although two unassigned and assigned frequencies were swapped in the present example, one frequency pair or many frequency pairs may be swapped so long as the filtering 320 requirements are met for each swapped frequency pair.

The system as described above produces a self-configuring or self-monitoring system. This provides a turn-key system for the system operator in that the system operator need not perform extensive frequency channel measurements to determine the frequency channels assigned to the cell 10 with the best signal quality. The system will also indicate any potential problems along a single frequency channel if that particular frequency channel rarely produces a signal quality that can be used to assign to the cell 10 for use.

Although preferred embodiments of the method and apparatus of the present invention have been illustrated in the accompanying Drawings and described in the foregoing Detailed Description, it will be understood that the invention is not limited to the embodiments disclosed, but is capable of numerous rearrangements, modifications and substitutions without departing from the spirit of the invention as set forth and defined by the following claims.

What is claimed is:

1. A method for managing frequencies allocated to a cell within a cellular network to assign certain ones of the allocated frequencies for use by channel equipment within that cell, said method comprising the steps of:

measuring at least one type of quality metric of at least two frequencies in a list of frequencies allocated to said cell, said list of allocated frequencies including channel equipment assigned and unassigned frequencies;

comparing said measured at least one type of quality metric with respect to multiple samples of the said unassigned frequencies and assigned frequencies; and swapping an unassigned frequency for an assigned frequency for assignment to the channel equipment if said step of comparing the multiple samples indicates that on average the said unassigned frequency has a better measured quality metric than said assigned frequency.

2. The method according to claim 1, said step of comparing further comprises the step of voting in favor of a certain one of said unassigned frequencies if said measured quality metric of that certain one of said unassigned frequencies indicates a higher signal quality for communication than said metric of a certain one of said assigned frequencies.

3. The method according to claim 2, wherein said step of voting further includes the step of adding at least one of the following numeric values to a memory location located in said telecommunications system:

a fixed value, a difference value between said quality metrics of said assigned frequency and unassigned frequency, an average value between said quality metrics of said assigned frequency and said unassigned frequency,
a weighted sum of an uplink frequency channel,
a downlink frequency channel, and
a numeric value produced by a mathematical cost function.

4. The method according to claim 3, wherein said unassigned and said assigned frequencies to be swapped by said step of swapping are selected by evaluating the results of said step of voting.

5. The method according to claim 1, further comprising the step of filtering numeric values produced by said step of comparing to prevent said step of swapping from occurring before at least one of the following is true:
   a minimum number of samples of said at least one metric have been taken,
   a minimum time duration has passed, and
   a minimum difference between said quality metric of said one unassigned frequency and said one assigned frequency exists.

6. The method according to claim 1, wherein said step of measuring is performed over a moving time window.

7. The method according to claim 1, wherein said at least one quality metric is at least one of a signal strength value and an interference strength value.

8. The method according to claim 1, wherein said step of measuring is performed on an uplink frequency channel.

9. The method according to claim 1, wherein said step of measuring includes measuring at least a single timeslot on at least one of said assigned frequency and said unassigned frequency.

10. The method according to claim 1, wherein said step of measuring said one of said assigned frequencies is performed on an idle frequency.

11. The method according to claim 1, wherein said step of measuring is performed on a downlink frequency channel.

12. The method according to claim 1, wherein said step of swapping further includes the step of frequency packing.

13. The method according to step 1, wherein said step of swapping occurs at at least one of the following instances:
   at call setup,
   a minimum of one minute intervals, and
   once per day.

14. A method for assigning frequencies in a base station serving a cell within a telecommunications network, said method comprising:
   measuring at least one type of quality metric from at least two frequencies of a plurality of m frequencies, said m frequencies being allocated to said base station, wherein n of said m frequencies are currently assigned to a plurality of transceivers of said base station and m−n frequencies are currently unassigned to said plurality of transceivers;
   voting from a number of samples of the n and m−n frequencies in favour of a certain one of said m−n frequencies to be assigned to said plurality of transceivers in place of one of the n frequencies if said at least one quality metric of said certain one of said m−n unassigned frequencies has a quality metric value higher than a quality metric value of said one of said n assigned frequencies; and
   swapping one of said m−n unassigned frequencies for one of said n assigned frequencies in response to a favourable vote.

15. The method according to claim 14, further comprising the step of comparing said at least one quality metric of said certain one of said n assigned frequencies against a quality metric of said certain one of said m−n unassigned frequencies.

16. The method according to claim 14, further comprising the step of filtering to prevent said step of swapping from occurring before at least one of the following events occur:
   a minimum number of samples of said quality metric are taken,
   a minimum time duration passes, and
   a minimum difference between said quality metric of said one of said m−n unassigned frequencies and said one of said n assigned frequencies exists.

17. The method according to claim 14, wherein said at least one quality metric is either a signal strength value or an interference strength value.

18. The method of claim 14, wherein said step of voting further includes the step of adding at least one of the following values to a memory location connected to said telecommunications system:
   a fixed value,
   a difference value between said at least one quality metric of said certain one of said m−n unassigned frequencies and said quality metric value of said one of said n assigned frequencies,
   an averaged difference value between an average value of said at least one quality metric of said certain one of said m−n unassigned frequencies and an average value of said at least one quality metric of said one of said n assigned frequencies,
   a weighted sum of said at least one quality metric of an uplink frequency channel and said at least one quality metric of a downlink frequency channel, and
   a numeric value produced by a mathematical cost function.

19. A system for assigning frequencies within a set of frequencies allocated to a base station transceiver equipment, said system comprising:
   a measuring device to measure multiple samples of at least one quality metric of at least one assigned frequency and at least one unassigned frequency, wherein said at least one assigned frequency is assigned to a transceiver and said at least one unassigned frequency is not assigned to a transceiver but is allocated for use by said base station;
   a processor operating to compare said at least one metric of said at least one assigned frequency to said at least one quality metric of said at least one unassigned frequency; and
   said processor operating to swap at least a certain one unassigned frequency for at least a certain one assigned frequency if said processor indicates from said comparison of multiple samples that said at least one unassigned frequency has a better measured quality metric than said at least one assigned.

20. The system according to claim 19, further comprising said processor operating to vote to add at least one of the following numeric values to a memory location within said telecommunications system:
   a fixed value,
   a difference value between said at least one quality metric of said at least one assigned frequency and said at least one quality metric of said at least one unassigned frequency,
   an average difference value between an average of said at least one quality metric of said at least one assigned frequency and an average of said at least one quality metric of said at least one unassigned frequency, a weighted sum of at least one quality metric of an uplink frequency channel and at least one quality metric of a downlink frequency channel, and a numeric value produced by a mathematical cost function.

21. The system according to claim 19, further comprising a processor operating to filter said measured quality metrics to prevent said processor from swapping said at least a certain one unassigned frequency for said at least a certain one unassigned frequency before at least one of the following events occur:

a minimum number of samples of said quality metric are taken, a minimum time duration passes, and a minimum difference between said quality metric of said unassigned frequency and said one assigned frequency exists.

22. The system according to claim 19, wherein said at least one quality metric is either a signal strength value or an interference strength value.

23. The system according to claim 19, wherein said measuring device is a mobile station in communication with said base station, said mobile station measures on at least one downlink frequency channel.

24. The system according to claim 23, wherein said mobile station measures at one of the following events:

prior to a page response, at call origination, and at call registration.

25. The system according to claim 19, wherein said measuring device is a location verification module, said location verification module measures on at least one uplink frequency channel.

26. The system according to claim 19, wherein said measuring device is a signal strength measuring device.

27. The system according to claim 19, wherein said measuring device measures on at least one timeslot.

28. The system according to claim 19, further including a means for frequency packing.

29. The system according to claim 19, wherein said at least one quality metric of said at least one assigned frequency and said at least one unassigned frequency is reported to said base station or a mobile switching center.

30. A system for assigning frequencies in a base station serving a cell within a telecommunication network, said system comprising:

a measuring device to measure multiple samples of at least one quality metric from at least two frequencies of a plurality of m frequencies, said m frequencies being allocated to said base station, wherein n of said m frequencies are currently assigned to a plurality of transceivers of said base station and m−n frequencies are currently unassigned to said plurality of transceivers;

a processor operating to vote from a number of samples of the n and m−n frequencies in favor of a certain one of said m−n frequencies to be assigned to said plurality of transceivers in place of one of the n frequencies if said at least one quality metric of said certain one of said m−n unassigned frequencies has a quality metric value higher than a quality metric value of said one of said n assigned frequencies;

said processor operating to swap one of said m−n unassigned frequencies for one of said n assigned frequencies in response to a favourable vote based on multiple samples.

31. The system according to claim 30, wherein said processor compares at least one quality metric of said certain one of said n assigned frequencies against a quality metric of said certain one of said m−n unassigned frequencies.

32. The system according to claim 30, further comprising a processor operating to filter said measured quality metrics to prevent said processor from swapping said at least a certain one unassigned frequency for said at least a certain one unassigned frequency before at least one of the following events occur:

a minimum number of samples of said quality metric are taken, a minimum time duration passes, and a minimum difference between said quality metric of said unassigned frequency and said one assigned frequency exists.

33. The system according to claim 30, wherein said at least one quality metric is either a signal strength value or an interference strength value.

34. The system according to claim 30, further comprising said processor operating to vote to add at least one of the following numeric values to a memory location within said telecommunications system:

a fixed value, a difference value between said at least one quality metric of said at least one assigned frequency and said at least one quality metric of said at least one unassigned frequency, an average difference value between an average of said at least one quality metric of said at least one assigned frequency and an average of said at least one quality metric of said at least one unassigned frequency, a weighted sum of at least one quality metric of an uplink frequency channel and at least one quality metric of a downlink frequency channel, and a numeric value produced by a mathematical cost function.

* * * * *